United States Patent
Neag et al.

[11] Patent Number: 6,129,401
[45] Date of Patent: Oct. 10, 2000

[54] VEHICLE STORAGE BIN

[75] Inventors: Dorinel Neag, Walled Lake; Stylianos A. Meidanis, West Bloomfield; Duane A. Koehler, Livonia, all of Mich.

[73] Assignee: DaimlerChrysler Corporation, Auburn Hills, Mich.

[21] Appl. No.: 09/358,278

[22] Filed: Jul. 21, 1999

[51] Int. Cl.$^7$ ...................................................... B60N 3/12
[52] U.S. Cl. .................... 296/37.6; 296/37.1; 296/24.1
[58] Field of Search ................... 296/37.6, 37.1, 296/24.1; 224/402, 404; 312/246, 248, 327, 328

[56] References Cited

U.S. PATENT DOCUMENTS

| | | |
|---|---|---|
| 322,965 | 7/1885 | Powell . |
| 1,295,372 | 2/1919 | Riddle et al. . |
| 2,812,097 | 11/1957 | Legge ....................................... 220/477 |
| 3,068,038 | 12/1962 | Doulass .................................. 296/24.1 |
| 3,492,042 | 1/1970 | Nachtigall ............................... 296/24.1 |
| 3,799,605 | 3/1974 | Silva ....................................... 296/24.1 |
| 4,355,837 | 10/1982 | Shimizu et al. . |
| 4,394,100 | 7/1983 | Sperlich . |
| 4,632,446 | 12/1986 | Douglas .................................. 296/37.6 |
| 4,643,314 | 2/1987 | Kidd . |
| 4,685,695 | 8/1987 | LaVee ..................................... 296/37.6 |
| 4,776,481 | 10/1988 | Kidd . |
| 5,125,710 | 6/1992 | Gianelo .................................. 296/37.1 |
| 5,197,775 | 3/1993 | Reeber . |
| 5,385,378 | 1/1995 | Hakamada et al. ................... 296/37.12 |
| 5,458,353 | 10/1995 | Hanemaayer ........................... 296/37.1 |
| 5,615,922 | 4/1997 | Blanchard .............................. 296/37.6 |
| 5,823,598 | 10/1998 | Clare et al. ............................. 296/37.6 |
| 5,845,954 | 12/1998 | DePue .................................... 296/37.12 |
| 5,904,389 | 5/1999 | Vaishnav et al. ...................... 296/37.1 |
| 6,007,130 | 12/1999 | Clare et al. ............................. 296/37.6 |
| 6,012,754 | 1/2000 | Clare et al. ............................. 296/37.6 |
| 6,030,018 | 2/2000 | Clare et al. ............................. 296/37.6 |

FOREIGN PATENT DOCUMENTS 13160   4/1910   Denmark .

*Primary Examiner*—Joseph D. Pape
*Assistant Examiner*—Kiran Patel
*Attorney, Agent, or Firm*—Roland A. Fuller, III

[57] ABSTRACT

A storage container assembly for deployment either within, or adjacent to, an external surface panel of a pickup truck, is described. The storage container assembly is intended to be deployed either within, or adjacent to, the box side panel section, i.e., the area between the rear wheel housings and the cab, of the pickup truck. The storage container assembly is comprised primarily of a storage bin or container and a pair of spaced and opposed brackets that are rigidly mounted to at least one surface of the pickup truck. Each bracket is provided with an integral slot that cooperates with a pin located on an external surface of the storage bin, thus allowing the storage bin to be pushed, pulled, or rotated from a closed position (i.e., substantially flush with the external surface of the box side panel section) to an open position (i.e., extending outwardly away from the external surface of the box side panel section) and vice versa. Additionally, an optional fascia panel, as well as an optional lid and optional locking assembly can also be provided to enhance the aesthetic appearance and security of the storage container assembly.

20 Claims, 5 Drawing Sheets

VEHICLE STORAGE BIN

BACKGROUND OF THE INVENTION

FIELD OF THE INVENTION

The present invention relates generally to containers, and more particularly to a storage container for deployment in the lower box side panel section of a pickup truck.

BACKGROUND AND SUMMARY OF THE INVENTION

Pickup trucks are generally comprised of a forward cab portion and a rear bed portion. The cab is typically occupied by the driver and any passengers, whereas the bed is used for storing and hauling various items. A pair of spaced and opposed rear wheel housings are typically located on the top surface of the bed portion so as to allow the rear tires to rotate freely. A pair of spaced and opposed lower box side panel sections are typically located between the cab and the rear wheel housings. These lower box side panel sections, which are typically constructed of sheet metal, generally extend downwardly from the top of the bed portion surface (e.g., the belt line) to a point corresponding to the mid-point height of the tire. Typically, the area behind the lower surface of the lower box side panel section is comprised of empty space.

Because the bed is typically open and unsecured, pickup truck owners have used various containers to store and secure valuable items such as tools and power equipment from would-be thieves. The most common type of container is generally referred to as a tool box or rear box and is usually placed across the width of the bed immediately behind the cab of the pickup truck. These rear boxes may be permanently or semi-permanently mounted to the bed to prevent the theft of the rear box and the contents contained therein. Additionally, these rear boxes typically must be locked in order to adequately safeguard their contents.

Conventional rear boxes suffer from several disadvantages. First, some rear boxes sit rather high above the side walls of the bed where they can be easily seen. Most rear boxes are not aesthetically pleasing and detract from the overall appearance of the pickup truck. Second, as previously noted, rear boxes are typically placed directly behind the cab. This location makes it very difficult to quickly and easily access the items contained in the rear box. This is especially true for elderly and handicapped persons who would find having to climb up several feet onto the bed to be a very difficult task. Third, because the rear box is placed on the bed surface, it takes up valuable cargo space that could be utilized more efficiently.

Therefore, there exists a need for a storage container that can be placed within, or adjacent to, an external surface panel of a pickup truck, wherein the storage container is easy to access, easy to secure, easy to install, and helps increase the available space in the bed of the pickup truck.

Accordingly, the present invention provides a storage container assembly for deployment either within, or adjacent to, an external surface panel of a pickup truck. The storage container assembly is intended to be deployed either within, or adjacent to, the lower box side panel section, i.e., the area between the rear wheel housings and the cab, of the pickup truck. The storage container assembly is comprised primarily of a storage bin or container and a pair of spaced and opposed brackets that are rigidly mounted to at least one surface of the pickup truck. Each bracket is provided with an integral slot that cooperates with a pin located on an external surface of the storage bin, thus allowing the storage bin to be pulled or rotated from a closed position (i.e., substantially flush with the external surface of the lower box side panel section) to an open position (i.e., extending outwardly away from the external surface of the lower box side panel section). Additionally, an optional fascia panel, as well as an optional lid and optional locking assembly can also be provided to enhance the aesthetic appearance and security of the storage container assembly.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from the detailed description.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE PREFERRED EMBODIMENTS

Figure 1:
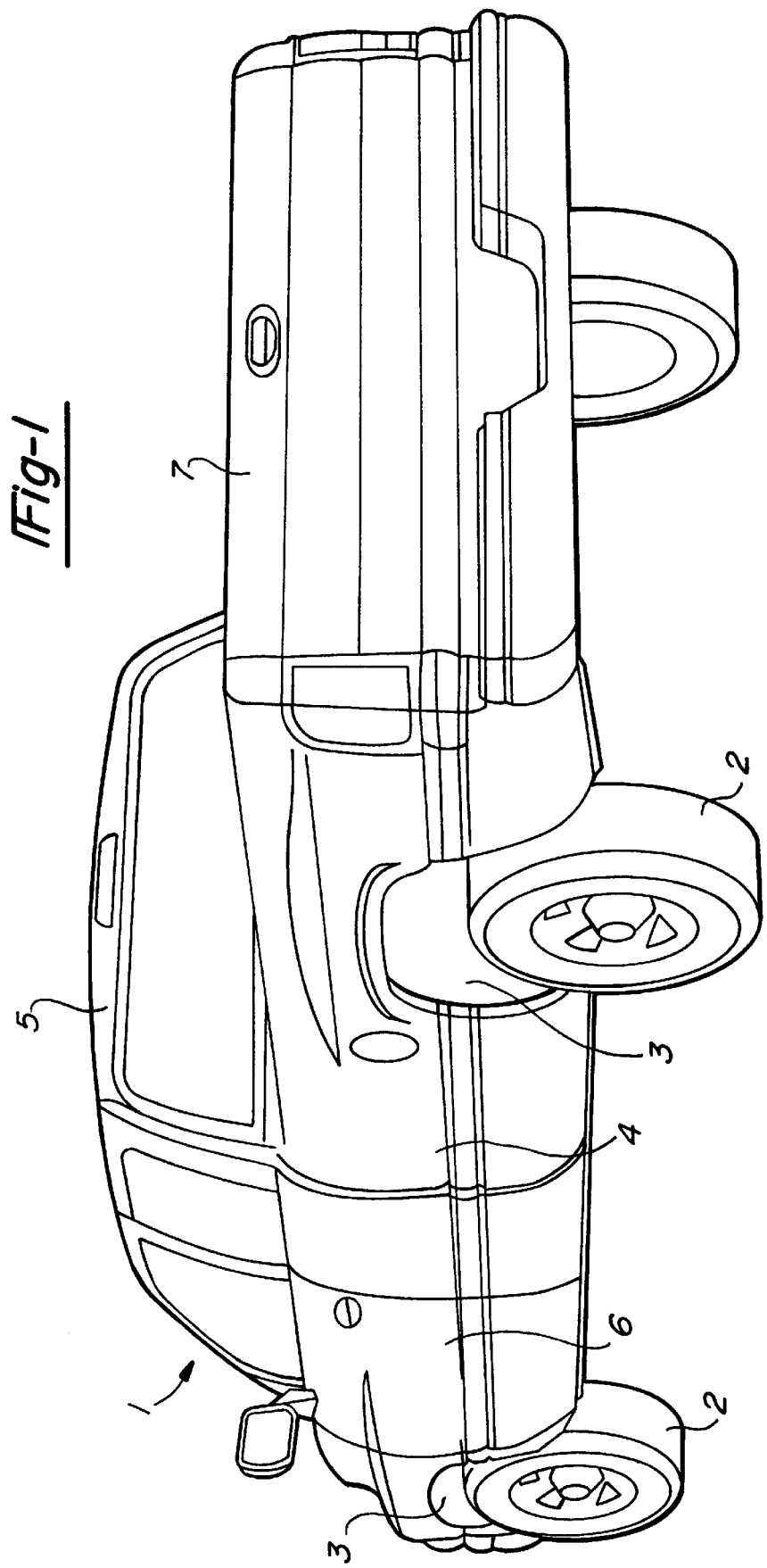
FIG. 1 is a perspective view of a pickup truck having a storage container assembly disposed within the lower box side panel of the pickup truck, in accordance with one aspect of the present invention.
Figure 2:
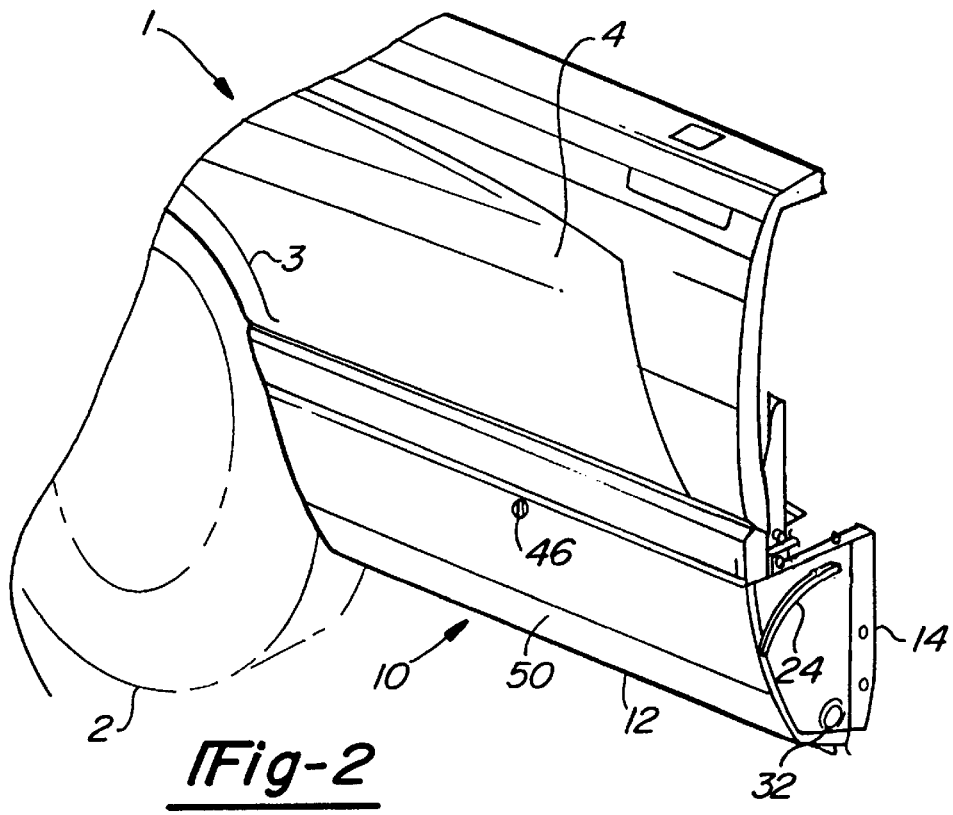
FIG. 2 is a partial fragmentary view of a storage container assembly in the closed position within the lower box side panel section of a pickup truck, in accordance with one aspect of the present invention.

Although the present invention is directed primarily to a storage container assembly for pickup trucks, it should be noted that the present invention can be practiced with any number of different types of vehicles, such as, but not limited to passenger sedans and coupes, sport utility vehicles (SUV's), emergency vehicles (e.g., ambulances), utility vehicles (e.g., golf carts), commercial trucks and vans, and the like.

The storage container assembly of the present invention is intended to be deployed either within, or adjacent to, the box side panel section (preferably the lower portion thereof) of the vehicle. This configuration takes advantage of the empty space typically located behind the lower portion of the box side panel section, or alternatively, the unused space located directly below the lower box side panel section. Additionally, although the present invention contemplates that the storage container assembly will be deployed within, or adjacent to, the lower box side panel section of the vehicle, it should be noted that the present invention can be practiced on other portions of the vehicle, such as, but not limited to the rear quarter panel, door panel, tailgate panel, and the like.

Referring to FIGS. 1–6, a vehicle 1, such as a pickup truck, typically includes at least one wheel 2, at least one wheel housing 3, at least one lower box side panel section 4, a cab 5, a door 6, and a bed portion 7.

In accordance with one embodiment of the present invention, if the storage container assembly 10 is deployed within lower box side panel section 4, it will be appreciated that a portion of the original lower box side panel section 4 must first be removed (e.g., cut away) in order to accommodate the assembly. The proper components of assembly 10 are then either fastened to bed portion 7 (e.g., a bottom surface), lower box side panel section 4 (e.g., behind an edge of the cut box side panel), and/or any other suitable structure.

In accordance with another embodiment of the present invention, if assembly 10 is deployed adjacent to lower box side panel section 4, i.e., below, it is simply a matter of fastening the proper components of assembly 10 to the bottom surface of either bed portion 7 and/or lower box side panel section 4, and/or any other suitable structure.

Figure 3:
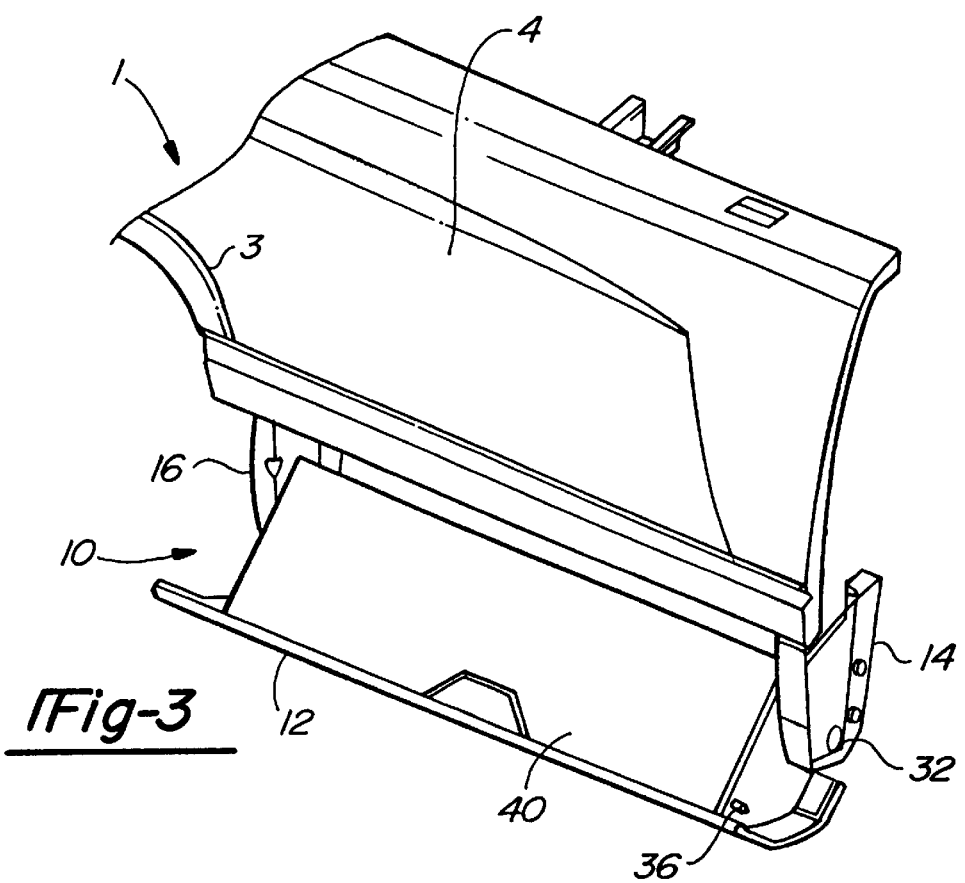
FIG. 3 is a partial perspective view of a storage container assembly, having an optional lid, in the open position within the lower box side panel section of a pickup truck, in accordance with one aspect of the present invention.
Figure 4:
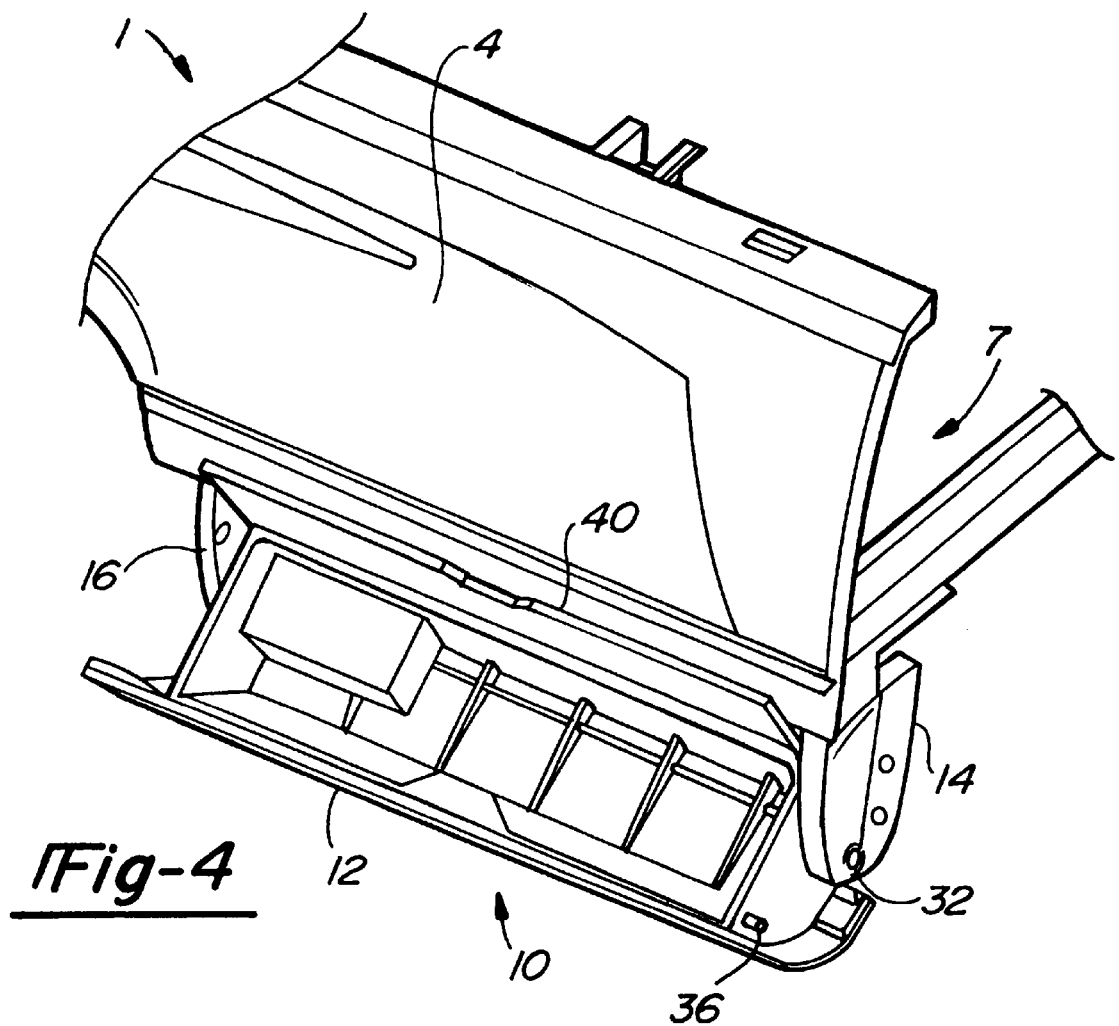
FIG. 4 is a partial perspective view of the storage container assembly depicted in FIG. 3, wherein the optional lid is raised to allow access to the interior area of the storage container, in accordance with one aspect of the present invention.
Figure 5:
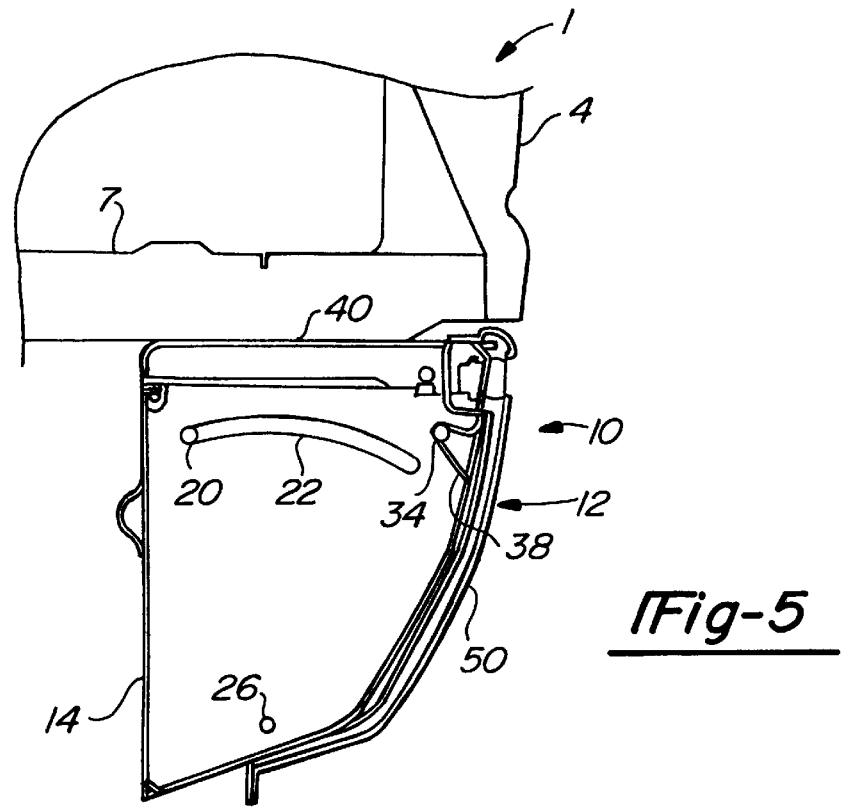
FIG. 5 is a partial sectional view of a storage container assembly in the closed position, in accordance with one aspect of the present invention.
Figure 6:
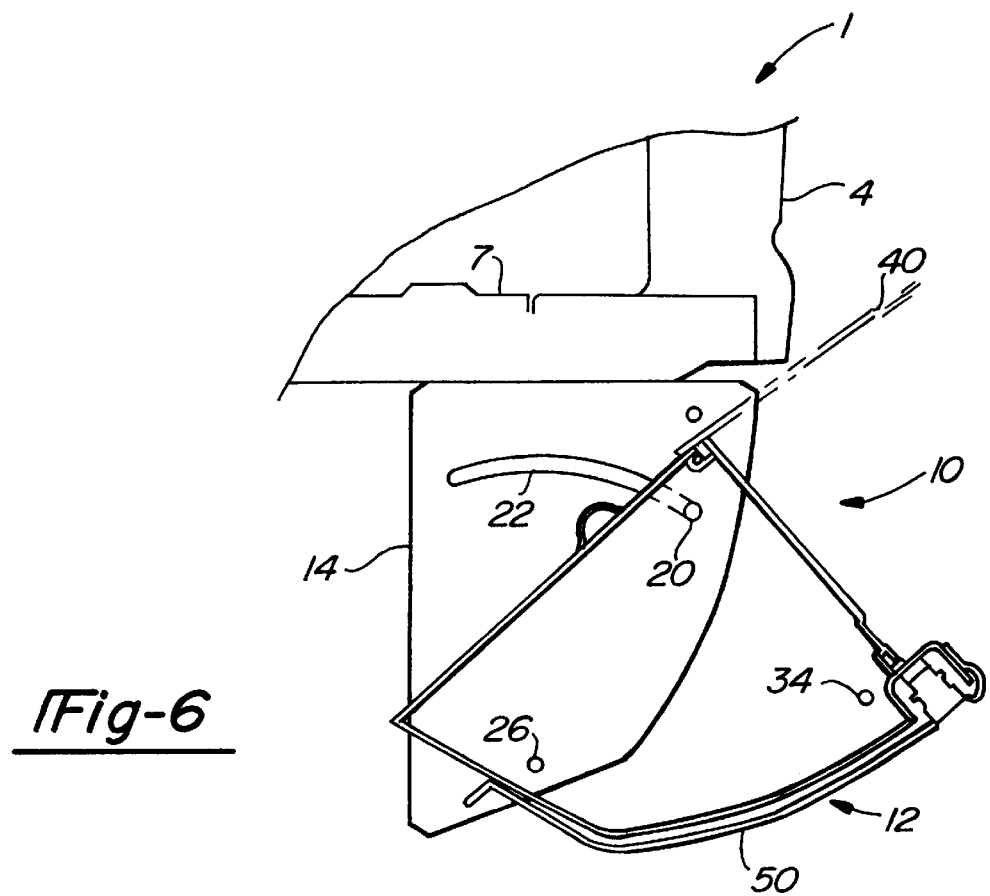
FIG. 6 is a partial sectional view of a storage container assembly in the open position, in accordance with one aspect of the present invention.

Once assembly 10 has been installed onto vehicle 1, it is possible to selectively pull, push, or rotate assembly 10 and/or portions thereof, between either a closed position (see FIGS. 2 and 5) and an open position (see FIGS. 3, 4, and 6).

Figure 7:
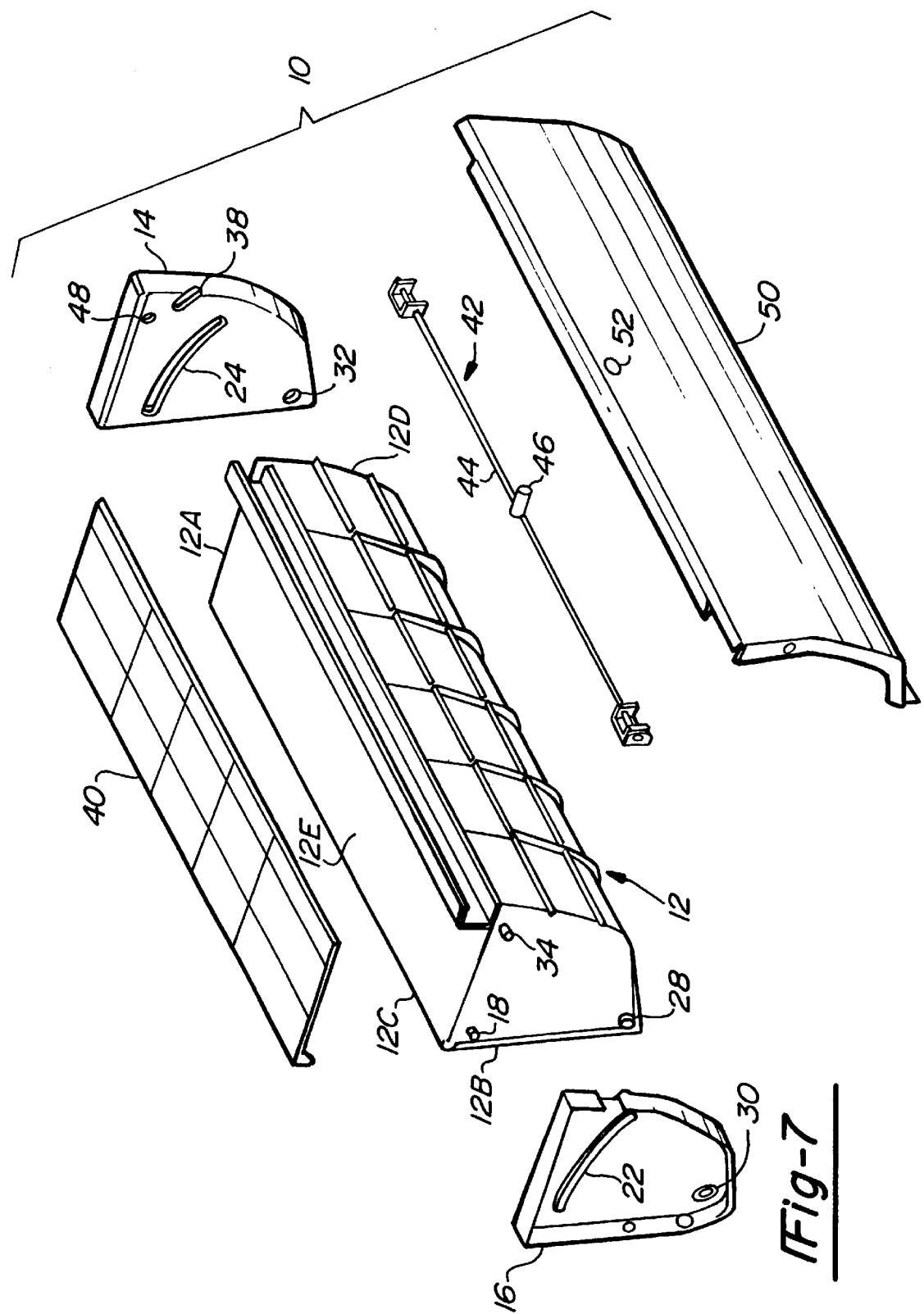
FIG. 7 is an exploded view of a storage container assembly, in accordance with one aspect of the present invention.

Referring to FIG. 7, there is shown an exploded view of a storage container assembly 10, in accordance with one embodiment of the present invention.

Assembly 10 is comprised of two primary components: a storage container or bin 12 and a pair of spaced and opposed brackets 14, 16. Storage bin 12 is comprised of a multi-sided container having spaced and opposed side walls 12A, 12B, spaced and opposed end walls 12C, 12D, and at least one open end 12E. The exact configuration of storage bin 12 is not critical provided that it can be pulled, pushed, or rotated between an open and closed position as previously described.

Storage bin 12 preferably includes a first pair of spaced and opposed pins 18, 20 (e.g., stop pins) that project from the side walls and are received within and cooperate with a pair of spaced and opposed grooves 22, 24 on the brackets 14, 16, respectively. Pins 18, 20 are preferably located at an upper portion of storage bin 12 in proximity to the rear surface of storage bin 12. Pins 18, 20 are preferably loosely received within grooves 22, 24, respectively, permitting storage bin 12 to move relative to brackets 14, 16. Grooves 22, 24 are preferably arcuate in shape, thus permitting pins 18, 20 to slide (within grooves 22, 24, respectively) forward from a closed position (see FIG. 5) to an open position (see FIG. 6) as storage bin 12 is pulled downwardly and outwardly by the operator until pins 18, 20 engage the rear-most surfaces of grooves 22, 24, respectively. In the open position, the open end 12E of the storage bin 12 is substantially parallel to the lower box side panel section 4 such that the operator has access to the open end 12E of the storage bin 12. Likewise, pins 18, 20 are also able to slide (within grooves 22, 24, respectively) backward from an open position (see FIG. 6) to a closed position (see FIG. 5) as storage bin 12 is pushed upwardly and inwardly by the operator until pins 18, 20 engage the forward-most surfaces of grooves 22, 24, respectively. In the closed position, the open end 12E of the storage bin 12 is substantially perpendicular to the lower box side panel section 4 such that the operator does not have access to the open end 12E of the storage bin 12.

Storage bin 12 preferably includes a second pair of spaced and opposed pins 26, 28 (e.g., hinge pins) that project from the side walls and are received within and cooperate with a pair of spaced and opposed apertures 30, 32 on brackets 14, 16, respectively. Pins 26, 28 are preferably located at a lower portion of storage bin 12 in proximity to the rear surface of storage bin 12. Pins 26, 28 are preferably loosely received within apertures 30, 32, respectively, permitting storage bin 12 to pivot or rotate about an axis relative to apertures 30, 32.

Storage bin 12 can optionally include a third pair of spaced and opposed pins 34, 36 (e.g., locator pins) that project from the side walls and are received within and cooperate with a recess 38 formed on the external surface of brackets 14, 16, respectively.

Brackets 14, 16 are preferably rigidly mounted to at least one surface of the vehicle 1, such as the bed portion 7, the lower box side panel section 4, and/or any other suitable structure. The only critical considerations are that the placement and mounting of brackets 14, 16 does not interfere with the proper operation of either the storage bin 12 or the vehicle i (e.g., wheel rotation, transmission placement, fuel tank placement, exhaust system placement, etc.).

Storage bin 12 can optionally be provided with a selectively operable lid or cover 40 that is preferably rotatably attached to the top portion of storage bin 12, preferably one of end walls 12C, 12D, respectively. Lid 40 can be used to prevent any stored items from inadvertently falling out of storage bin 12 when in the open position. Once storage bin 12 is in the open position, lid 40 can conveniently be lifted up by the operator to permit access to the interior area of storage bin 12 (see FIG. 4).

Storage bin 12 can optionally be provided with a selectively operable locking assembly 42 in order to secure storage bin 12 when in the closed position. By way of a non-limiting example, a sliding rod 44 can be selectively actuated by a latch assembly 46 so as to slide the rod horizontally into a pre-drilled hole 48 in bracket 14, thus securing storage bin 12 in place. It is envisioned that any number of conventional locking assemblies and mechanisms may be employed to secure storage bin 12 when in the closed position.

Storage bin 12 can optionally be provided with a fascia panel 50 that is fastened onto the outer surface of one of the end walls 12C, 12D, respectively, of the storage bin 12 so as to provide an aesthetically pleasing appearance. If fascia panel 50 is employed, it should preferably include an aperture 52 to permit latch assembly 46 (if employed) to extend therethrough. Preferably, fascia panel 50 is color matched to the rest of the vehicle 1, so as not to clash or stand out. Alternatively, fascia panel 50 may be of a different color or a different type of paint (e.g., fluorescent) so as to stand out and be readily identifiable in an emergency situation (e.g., storage of life-saving equipment on a fire engine truck, ambulance, and the like).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A storage container assembly for a vehicle having at least one external surface panel, comprising:
   a storage bin having spaced and opposed side walls, spaced and opposed end walls, and at least one open end, the storage bin having first and second pairs of opposed and spaced pins projecting from the side walls; and
   a pair of spaced and opposed brackets rigidly fastened to at least one surface of the vehicle in proximity to the at least one external surface panel, the pair of brackets having a pair of spaced and opposed grooves for slidably receiving the first pair of pins, the pair of brackets having a pair of spaced and opposed areas defining apertures for pivotably receiving the second pair of pins;
   wherein when the first pair of pins are at a first position with respect to the grooves, the open end of the storage bin can not be accessed;
   wherein when the first pair of pins are at a second position with respect to the grooves, the open end of the storage bin can be accessed.

2. The storage container assembly of claim 1, further comprising a selectively operable lid panel fastened to at least one of the end walls of the storage bin.

3. The storage container assembly of claim 1, further comprising a fascia panel fastened to at least one of the end walls of the storage bin.

4. The storage container assembly of claim 1, further comprising a locking assembly for securing the storage bin to at least one of the brackets.

5. The storage container assembly of claim 1, wherein the vehicle comprises a pickup truck.

6. The storage container assembly of claim 1, wherein the at least one external surface panel comprises a box side panel.

7. The storage container assembly of claim 1, wherein the at least one external surface panel comprises a lower portion of a box side panel.

8. The storage container assembly of claim 1, wherein the pair of grooves have an arcuate configuration.

9. A storage container assembly for a vehicle having at least one external surface panel, comprising:
   a storage bin having spaced and opposed side walls, spaced and opposed end walls, and at least one open end, the storage bin having first and second pairs of opposed and spaced pins projecting from the side walls; and
   a pair of spaced and opposed brackets rigidly fastened to at least one surface of the vehicle in proximity to the at least one external surface panel, the pair of brackets having a pair of spaced and opposed grooves for slidably receiving the first pair of pins, the pair of brackets having a pair of spaced and opposed areas defining apertures for pivotably receiving the second pair of pins;
   wherein when the first pair of pins are at a first position with respect to the grooves, the open end of the storage bin is substantially perpendicular to the external surface panel;
   wherein when the first pair of pins are at a second position with respect to the grooves, the open end of the storage bin is substantially parallel to the external surface panel.

10. The storage container assembly of claim 9, further comprising a selectively operable lid panel fastened to at least one of the end walls of the storage bin.

11. The storage container assembly of claim 9, further comprising a fascia panel fastened to at least one of the end walls of the storage bin.

12. The storage container assembly of claim 9, further comprising a locking assembly for securing the storage bin to at least one of the brackets.

13. The storage container assembly of claim 9, wherein when the first pair of pins are at a first position with respect to the grooves, the open end of the storage bin can not be accessed, and wherein when the first pair of pins are at a second position with respect to the grooves, the open end of the storage bin can be accessed.

14. The storage container assembly of claim 9, wherein the vehicle comprises a pickup truck.

15. The storage container assembly of claim 9, wherein the at least one external surface panel comprises a box side panel.

16. The storage container assembly of claim 9, wherein the pair of grooves have an arcuate configuration.

17. A storage container assembly for a vehicle having at least one external surface panel, comprising:
   a storage bin having spaced and opposed side walls, spaced and opposed end walls, and at least one open end, the storage bin having first and second pairs of opposed and spaced pins projecting from the side walls;
   a pair of spaced and opposed brackets rigidly fastened to at least one surface of the vehicle in proximity to the at least one external surface panel, the pair of brackets having a pair of spaced and opposed grooves for slidably receiving the first pair of pins, the pair of brackets having a pair of spaced and opposed areas defining apertures for pivotably receiving the second pair of pins;
   a selectively operable lid panel fastened to at least one of the end walls of the storage bin;
   a fascia panel fastened to at least one of the end walls of the storage bin; and
   a locking assembly for securing the storage bin to at least one of the brackets;
   wherein when the first pair of pins are at a first position with respect to the grooves, the open end of the storage bin can not be accessed;
   wherein when the first pair of pins are at a second position with respect to the grooves, the open end of the storage bin can be accessed.

18. The storage container assembly of claim 17, wherein the vehicle comprises a pickup truck.

19. The storage container assembly of claim 17, wherein the at least one external surface panel comprises a box side panel.

20. The storage container assembly of claim 17, wherein the pair of grooves have an arcuate configuration.

* * * * *